UNITED STATES PATENT OFFICE.

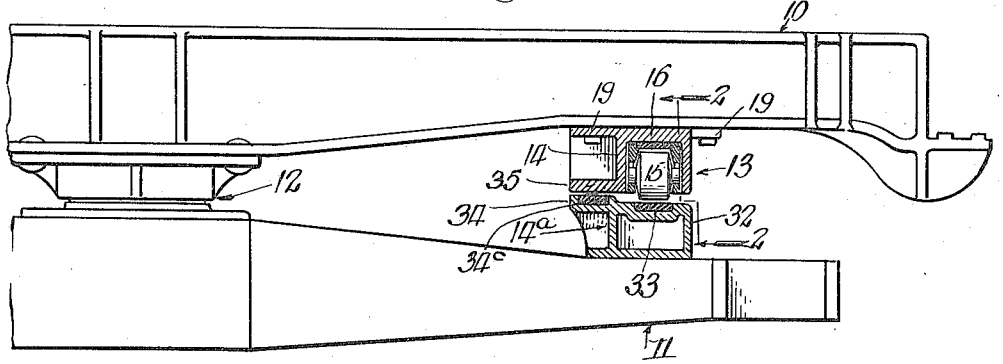
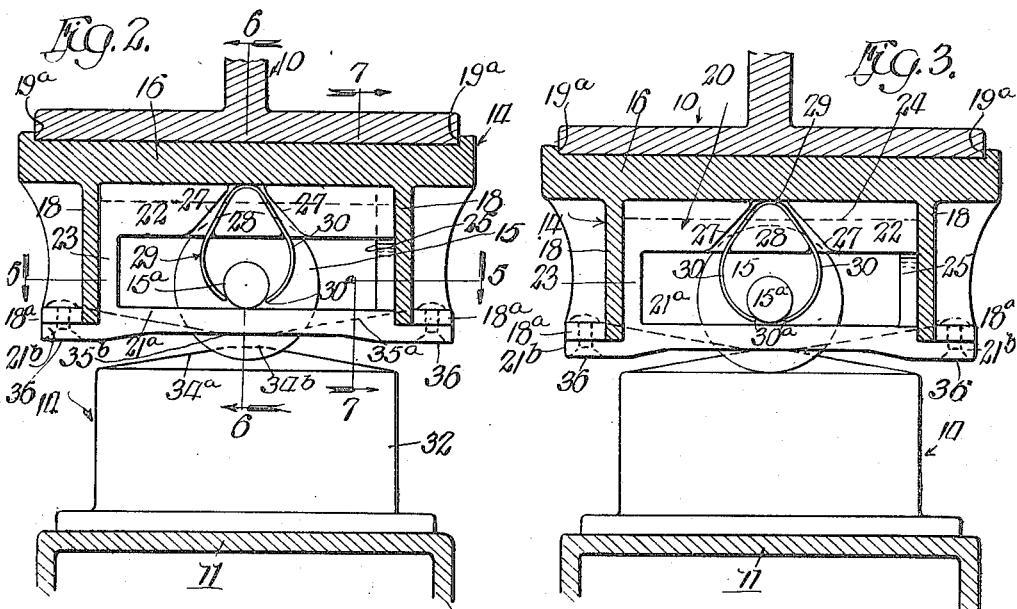

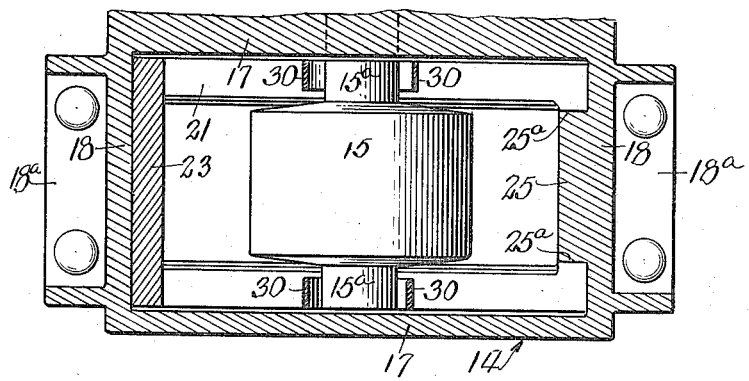
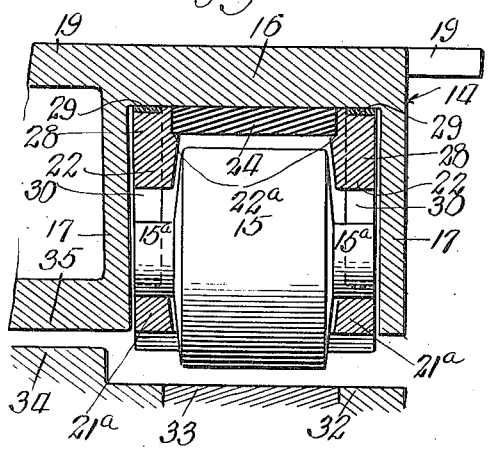
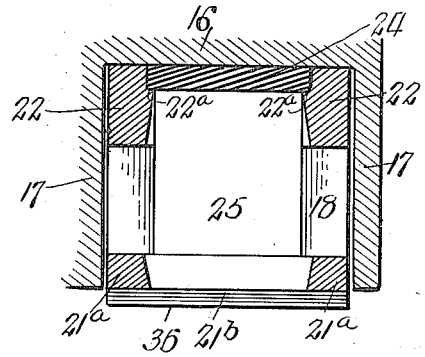
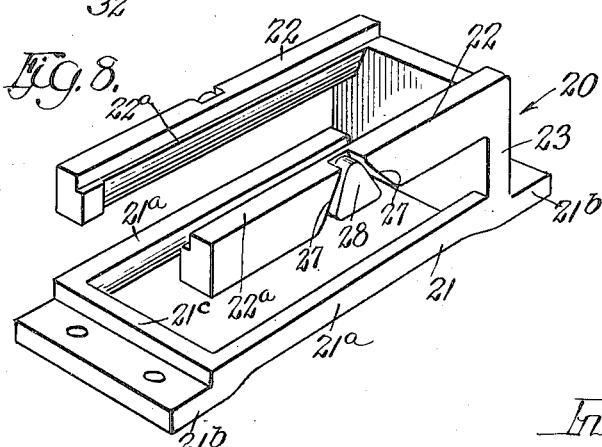

ARNOLD A. WEIGEL, OF CHICAGO, ILLINOIS, ASSIGNOR TO EDWIN S. WOODS, OF CHICAGO, ILLINOIS; ALBERT G. WELCH, EXECUTOR OF SAID EDWIN S. WOODS, DECEASED, ASSIGNOR TO ALBERT G. WELCH, TRUSTEE.

ANTIFRICTION-BEARING.

1,221,781.  Specification of Letters Patent.  Patented Apr. 3, 1917.

Application filed September 22, 1913. Serial No. 791,022.

*To all whom it may concern:*

Be it known that I, ARNOLD A. WEIGEL, a citizen of the United States, and a resident of Chicago, in the county of Cook and State of Illinois, have invented certain new and useful Improvements in Antifriction-Bearings; and I do hereby declare that the following is a full, clear, and exact description thereof, reference being had to the accompanying drawings, and to the letters of reference marked thereon which form a part of this specification.

This invention relates to improvements in antifriction bearings and consists of the matters hereinafter described and more particularly pointed out in the appended claims. The invention is shown herein applied for use in connection with a car side bearing.

In the drawings:—

Figure 1 is a view representing a partial front elevation of the body and the truck-bolster of a car, with my improved side bearing in operative position between the two bolsters near their ends.

Fig. 2 is a view representing on an enlarged scale, a longitudinal section through my improved antifriction bearing, said section being taken in a plane indicated by the line 2—2 of Fig. 1.

Fig. 3 is a view similar to Fig. 2 except that the bearing is shown with the parts in the position which they occupy when load is being transmitted through the bearing with the car running on a straight track, the body and truck bolsters in the same vertical plane, and the ends of the rail bolsters between which the bearing is interposed, having vibrated toward one another.

Fig. 4 is a partial section similar to Fig. 3, with the parts as they appear when load is being transmitted through the bearing and one bolster is oscillating with reference to the other.

Fig. 5 is a view representing on a larger scale a transverse section through Fig. 2 in a plane indicated by the line 5—5 thereof.

Fig. 6 is a view on a like scale representing a vertical section through Fig. 2 in a plane indicated by the line 6—6 thereof.

Fig. 7 is a view representing a section through Fig. 2 in a plane indicated by the line 7—7 thereof.

Fig. 8 is a perspective view of a filler block used in the construction.

Referring now to that embodiment of my invention illustrated in the drawings, 10 indicates the body bolster and 11 the truck-bolster of a car, said two bolsters being pivoted at 12. 13 indicates, as a whole, my improved antifriction bearing which is interposed between the said bolsters near the ends thereof in a familiar manner. The antifriction bearing, as illustrated herein, consists of a casing 14 attached to the body-bolster 10 and containing an antifriction element 15, which is capable of longitudinal movement in said casing, and which is adapted for rolling engagement with a bearing block 14$^a$ carried by the truck bolster.

The casing 14 consists of a longitudinally elongated shell open at the bottom and having a top wall 16, side walls 17, 17, and end walls 18, 18. The top wall 16 is provided with horizontal flanges 19, 19, projecting beyond the shell and adapted to provide places for attaching bolts by means of which the casing is secured to the body-bolster. The top of the casing is preferably provided with transverse, upright shoulders 19$^a$, 19$^a$, for engagement with the lateral edges of the body-bolster to take up the end thrust of the casing in the operation of the bearing.

The antifriction element 15 has trunnions 15$^a$ of familiar construction for suspending it within the casing. Rails in the casing for the support of said trunnions are provided as follows:

20 indicates, as a whole, (see Fig. 8) a filler-block which is constructed so as to be capable of insertion through the open bottom of the casing and which is provided with suitable means for attaching it to the bottom edges of the casing. Said filler-block in side elevation is roughly in the shape of a U, and comprises an open rectangular bottom frame 21, parallel laterally spaced top bars 22, 22, and an upright transverse plate 23 at one end which connects the two top bars 22 with the open frame 21. 21$^a$, 21$^a$, indicate the longitudinally extending side members of the U-shaped filler-block which are adapted to form the bottom rails for the support of the trunnions 15$^a$ of the antifriction element. When the filler-block is in place in the casing the top bars 22, 22, together with said bottom rails 21$^a$, 21$^a$, define channels which confine the trunnions of the antifriction element. The bottom frame 21 has extensions 21ᵇ, 21ᵇ, at its ends adapted to engage against and to be suitably attached to end flanges 18ᵃ, 18ᵃ, at the bottoms of the end walls of the casing.

When the filler-block is in place, the outer face of the plate 20 of the filler-block engages against the inner face of one end wall of the casing, while there is provided at the other end of the frame 21 an upright transverse shoulder 21ᶜ which engages against the lower margin of the other end wall of the casing. Longitudinally extending horizontal shoulders 22ᵃ are provided on the inner faces of each of the top bars 22 of the filler-block, said shoulders being adapted to confine between them and the top wall of the casing a wear-plate 24. The inner faces of both the top bars 22, 22, and of the lateral members 21ᵃ, 21ᵃ, of the filler-block are beveled as shown to present thrust shoulders for the ends of the antifriction element. Preferably there is provided in the casing end wall at the open end of the filler-block a vertically extending rib 25 (see Fig. 5) to form shoulders 25ᵃ for engagement against the inner faces of the top bars 22 of the filler-block in order to maintain said bars in their proper spaced relation.

To assemble the bearing, the antifriction element is placed in the U-shaped filler-block with its trunnions between the top bars 22 and the lateral members 21ᵃ of the open frame 21 of the filler-block. The wear-plate 24 is then placed on the longitudinal shoulders 22ᵃ, 22ᵃ and the filler-block, with the antifriction element supported by it, is then inserted into the casing through its open bottom side. The extensions 21ᵇ of the filler-block are then attached as by rivets to the flanges 18ᵃ of the casing.

To center the antifriction element the following construction is provided: There are formed in the outer faces of each of the top bars 22 of the filler-block divergent channels 27, 27, which define a V-shaped lug 28 in said bars. 29, 29 indicate springs which are suspended from said lugs and which have oppositely disposed bent arms 30, 30, having ends 30ᵃ—30ᵃ, which engage against the trunnions of the antifriction element. By reason of the lug and channel construction just described, the arms of the springs are held in place and when the antifriction element moves toward one or the other end of the casing, it puts in tension those arms toward which it moves so that said arms will return it toward a normal central position when it is released. At the same time when the antifriction element is so returned, its trunnions will strike the other spring arms and will be thereby prevented from passing beyond its normal position toward the opposite end of the casing. The springs are, of course, placed in their channels before the filler-block is put into the casing.

In order to prevent pounding and wear of the antifriction element, due to the vibration of the body and truck-bolsters toward and from one another when the car is going on a straight track and when there is no tendency to oscillation between said bolsters, the following construction is provided:

The bearing 14ᵃ carried by the truck-bolster consists of a block 32 of any suitable construction having secured in its top face a wear-plate 33 to provide a bottom bearing surface for the antifriction element. Both the casing 14 and the block 32 are offset to one side of the path of the antifriction element, to the inside as shown herein, to provide bearing members 34, 35, which will engage when the body and truck-bolsters are substantially in the same vertical plane, as when the car is going along a straight track, and when the antifriction element is in its normal or other position. The said bearing members 34, 35 are so formed that they become inoperative to transmit load as soon as the bolsters oscillate beyond the said position when the antifriction element takes the load in the usual manner.

Both bearing members 34, 35 consist of lugs or bumpers (see Figs. 2 and 3) placed in the vertical planes of the longitudinal central axes of their respective bolsters and are so proportioned that when the said two axes are in the same plane, the said lugs will engage and prevent the load in this position of the bolsters from being transmitted through the antifriction element. In both cases, as illustrated, the lugs are formed on plates 34ᵃ, 35ᵃ, respectively, which are inclined from each end upwardly in the one case and downwardly in the other case, toward the vertical plane through the longitudinal central axis of their respective bolsters, having short horizontal parts 34ᵇ, 35ᵇ, in the neighborhood of said planes to form the before mentioned lugs or bumpers. One of said lugs, preferably, has a wear-plate 34ᶜ.

In the operation of car antifriction bearings, during much of the time, there is little or no oscillation of the bolsters between which the bearings are interposed in the plane of operation of said bearings while at the same time there is considerable vibration of the bolsters in a plane at right angles to said plane. This, in prior constructions, produces useless pounding on the antifriction element which is entirely obviated by the construction just described. The application of this feature of my invention to types of antifriction bearings other than that to which it is shown applied herein in order to illustrate it, will be apparent to those familiar with the art.

To provide a plain antifriction bearing for operation in case of failure or breakage of the antifriction element, I form depending lugs or projections 36 on the bottom of the casing 14 at each end thereof and in the plane of the antifriction element so as to be capable of sliding bearing engagement against the wear-plate 33 if the antifriction element 15 is not present. The bottom faces of said lugs are formed in a horizontal plane which is spaced from the wear-face of the wear-plate 24 in the casing a distance less than the diameter of the antifriction element. Thus as long as the antifriction element is present to transmit load the lugs 36 will not engage with the wear-plate carried by the bolster. As shown the lugs 36 are formed on the bottom of the U-shaped filler-block 20. Manifestly this feature of my invention, as in the case of the one last described, is applicable to types of antifriction bearings other than that shown herein for purposes of illustration.

While in describing my invention I have referred to certain details of mechanical construction and arrangement, it is to be understood that my invention is in no way limited thereby except in so far as may be pointed out in the appended claims.

I claim as my invention:

1. An antifriction bearing comprising in combination with oscillating members between which said bearing is interposed, a casing fixed to one of said oscillating members, an antifriction element having trunnions located in said casing, means providing spaced bearing rails in said casing upon which the trunnions of said antifriction element are adapted to bear, said casing having a fixed bearing lug, a second bearing lug fixed on the other one of said oscillating members, said bearing lugs protecting said antifriction element from load when said oscillating members are in their normal relative positions.

2. An antifriction bearing comprising in combination with upper and lower oscillating members between which said bearing is interposed, an antifriction element having trunnions, means carried by said upper oscillating member providing spaced bearing rails upon which the trunnions of said antifriction element bear and travel in a plane at approximately right angles to the plane of said oscillating members, said means including a fixed bearing lug located in a plane to one side of the plane of said spaced bearing rails and a second bearing lug fixed on said lower oscillating member, said bearing lugs being adapted to engage each other and transmit load independent of the antifriction element when said oscillating members are in the same vertical plane.

3. An antifriction bearing comprising in combination with upper and lower oscillating members between which said bearing is interposed, an antifriction element having trunnions, a casing carried by said upper oscillating member, means providing spaced bearing rails in said casing upon which the trunnions of said antifriction element bear, said casing including a fixed lug providing a downwardly facing bearing surface, means providing an upwardly facing bearing surface on said lower oscillating member, said upwardly facing bearing surface being normally engaged with the downwardly facing bearing surface on said casing and transmitting load between said oscillating members independently of the antifriction element when said oscillating members are in their normal relative positions.

4. An antifriction bearing comprising a casing adapted to be attached to one of a pair of oscillating members, a bearing block adapted to be attached to the other one of the said pair of oscillating members, said bearing block having upwardly facing bearing surfaces, arranged in different horizontal planes, an antifriction element in said casing, one of said bearing surfaces on said bearing block being associated with said antifriction element, said antifriction element being adapted to travel longitudinally in said casing and bear upon the associated bearing surface of said bearing block when transmitting load, said casing having a fixed lug intermediate its ends which provides a downwardly facing bearing surface adapted to engage the other of said bearing surfaces on said bearing block, said lug on said casing being adapted to transmit load to said bearing block independent of the antifriction element when said oscillating members are in their normal relative position.

5. In an antifriction bearing, a casing open at the bottom, an antifriction element longitudinally movable therein, and a filler block opening at one end capable of insertion through the open bottom of said casing, said filler-block being constructed to receive the antifriction element at one end before its introduction into the casing and to suspend said antifriction element within the casing.

6. In an antifriction bearing, a casing open at the bottom, an antifriction element longitudinally movable therein, said antifriction element having trunnions and a U-shaped filler-block capable of insertion through the open bottom of said casing, said filler-block providing upper and lower rails for the trunnions of said antifriction element.

7. In an antifriction bearing, a casing open at the bottom, an antifriction element longitudinally movable therein, said antifriction element having trunnions, and a filler-block capable of insertion through the open bottom of said casing, said filler block consisting of an open bottom frame, of top bars vertically spaced therefrom and of an integral end plate, said top bars and bottom frame defining channels for said trunnions, and means for attaching said filler block to said casing.

8. In an antifriction bearing, a casing, an antifriction element longitudinally movable therein, said antifriction element having trunnions, and springs suspended at each side of said casing in the paths of said trunnions, said springs each having oppositely disposed bent arms adapted for engagement with said trunnions.

9. In an antifriction bearing, a casing open at the bottom, an antifriction element longitudinally movable therein, a filler-block capable of insertion through the open bottom of said casing adapted to confine said antifriction element in said casing, and resilient devices carried by said filler-block adapted to return said antifriction element to its normal position when it is released from load.

10. In an antifriction bearing, a casing open at one side, an antifriction element having trunnions and being longitudinally movable therein, a filler-block capable of insertion through the said open side of said casing and being constructed to provide rails for said trunnions, and resilient devices locked within said casing by means of said filler-block adapted for centering said antifriction element.

11. In an antifriction bearing, a casing open at one side, an antifriction element having trunnions and being longitudinally movable in said casing, a U-shaped filler-block capable of insertion through the said open side of said casing and providing upper and lower rails to confine said trunnions, said upper rails having divergent channels formed in their outer faces forming lugs, and springs suspended from said lugs and adapted for centering said antifriction element.

In testimony that I claim the foregoing as my invention I affix my signature in the presence of two witnesses, this 18th day of September A. D. 1913.

ARNOLD A. WEIGEL.

Witnesses:
T. H. ALFREDS,
KARL W. DALL.